Nov. 29, 1949     C. V. HENLEY     2,489,963
COTTON PICKER

Filed Nov. 9, 1945     2 Sheets-Sheet 1

INVENTOR.
Charles V. Henley
BY
Munn, Liddy, Glascum & Rich
Attys.

Nov. 29, 1949  C. V. HENLEY  2,489,963
COTTON PICKER
Filed Nov. 9, 1945  2 Sheets-Sheet 2

INVENTOR.
Charles V. Henley
BY
Munn, Liddy, Glaccum & Rich
Attys.

Patented Nov. 29, 1949

2,489,963

UNITED STATES PATENT OFFICE 2,489,963

COTTON PICKER

Charles V. Henley, Stone Mountain, Ga.

Application November 9, 1945, Serial No. 627,586

6 Claims. (Cl. 56—30)

My present invention has for its object to provide a cotton gathering machine comprising a casing which may be moved along a row of cotton plants having gates at its forward and rear ends permitting the passage therethrough of the plants yet maintain a sufficient seal to enable the loosened cotton to be carried away by an air stream.

My invention also comprehends including within such a casing means for engaging and agitating the plants to dislodge the cotton therefrom to insure its being picked up by the air blast.

Another object of my invention resides in supporting such a casing whereby it may freely adjust itself to irregularities existing in a row of cotton plants and so otherwise arranging the elements of the machine that two or more rows of plants may be picked simultaneously.

To these and other ends my invention embodies further features of construction, all of which will be fully described in the accompanying specification, the novel features thereof being set forth in the appended claims.

In the drawings.

Similar reference characters in the several figures indicate similar parts.

In portraying my invention I have shown a two-row harvesting machine and as the parts for each row are duplicated a description of those and for a single row will suffice for both.

Figure 1:
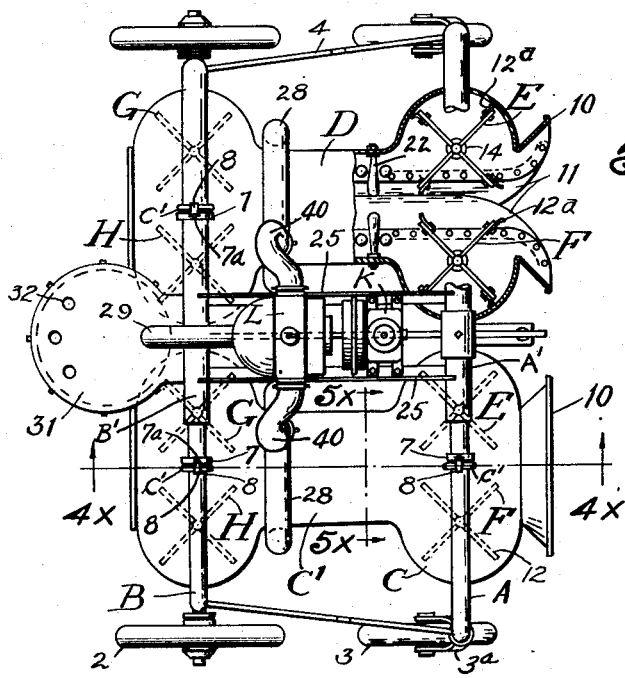
Figure 1 is a top plan view of a two row cotton picker illustrating one embodiment of my present invention parts of one of the casings being broken away to show the revolving doors therein.
Figure 2:
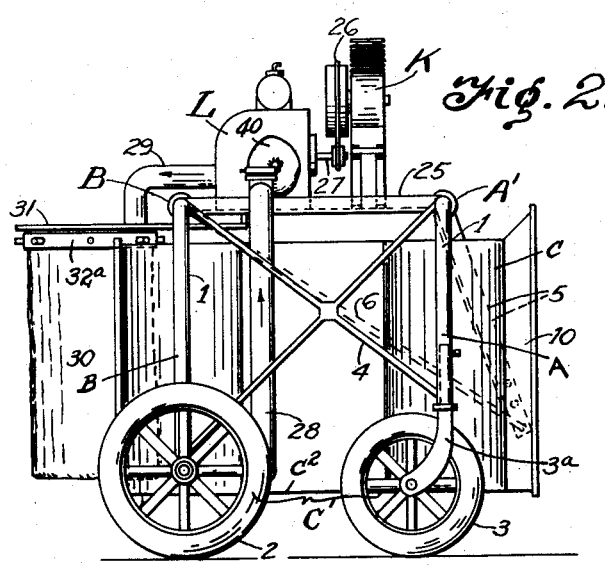
Figure 2 is a side elevation thereof.
Figure 3:
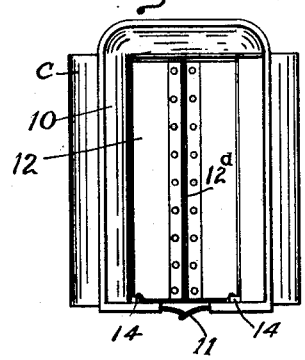
Figure 3 is a front view of one of the casings through which the cotton plants pass showing the pair of front gates in the closed position.

In carrying out my invention I mount the parts on a framework which is adjustable to accommodate plant rows of various widths and suspend the picking elements thereon in such a manner that they readily accommodate themselves to the irregularities which occur as a result of the original planting, subsequent cultivation, or from other sources. The frame of the machine comprises two inverted U-shape members forming front and rear sections A and B respectively, each being composed of tubular material forming vertical side legs I and I' and an upper horizontal transverse telescoping portion A' and B', which are securely locked together, once the plant row width has been determined. The downwardly extending legs on the rear frame B carry the ground wheels 2 and the legs of frame A carry the castor supported wheels 3 which are carried in forks 3a having shanks journaled in the legs I of Fig. 1 of frame A as shown in dotted lines in Fig. 2 so as to readily turn to guide the machine at curves in the plant rows, and in making turns at the edges of a field. As shown in Fig. 2 the two frames A and B are connected by cross bracing 4.

In order to leave the space between the legs of frames A and B clear, to accommodate the harvesting apparatus, the towing connections by which the machine is drawn in a forward direction is connected to the arch or horizontal portion of the forward frame piece A. These comprise an angle bar 5 extending downwardly and forwardly from the frame A for the attachment of the draw bar of a tractor, or other vehicle at its lower end, and from this point a tie rod 6 extends upwardly and rearwardly to the top arch or horizontal portion of the rear frame pieces B.

Suspended from the frame pieces A and B are the harvesting chambers or casings C and D. These are supported on coil springs c and c' at their front and rear ends, which allow the casings to adjust themselves to inequalities of the ground level by moving upwardly freely and also to swing laterally as may be required as they follow irregularities of the plant rows. The springs c and c' are held in adjusted position on the horizontal reaches of frames A and B by collars 7 locked in place by set screws 7a and having hooked fingers 8 which engage over the convolutions of the springs which are bent at right angles to their axes and are wrapped around said frame pieces.

The harvesting casings are open at each end and their forward ends are flared at the sides and top outwardly, as indicated at 10, which serve as guides for the cotton plants. The bottoms of those casings have a central slot which is normally closed by strips of yielding material 11 which overlap along the central line of the slot and act to partially close the latter as a cotton plant advances therethrough.

Figure 6:
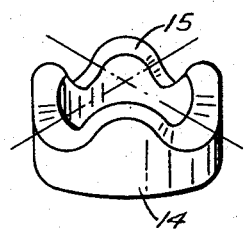
Figure 6 is an enlarged perspective view of one of the gate collars.

At the forward end of the casing are a pair of revolving doors E and F, each comprising four blades 12 having flexible edges 12a of a rubber-like composition. The axes of these doors are in the same vertical plane and are so spaced that they act as turnstiles upon the entry of a cotton plant between them, permitting its passage into the casing, their flexible edges coming together successively behind the plants in yielding engagement and serving to substantially seal the entrance of the casing. In order to prevent the doors from spinning on their axes and to insure the meeting of their flexible edges, yet permit the entry of the plants between them I provide at the lower end of each axis a collar 14 the upper face of which has a wave-like form thus providing two pairs of cam surfaces 15 (see Fig. 6). The bottom edges of opposite wings of the doors normally rest in the bottoms of said cams and are permitted sufficient vertical movement to rise over the points of the cam when rotary movement is imparted to them by engagement with a plant or plants.

At the rear of the casing is a duplicate set of revolving doors G and H which as the stripped plants exit from the casing also have the same step by step, or intermittent revolving movement heretofore described in connection with the doors E, F, their flexible edges meeting to substantially seal this end of the casing.

Figure 4:
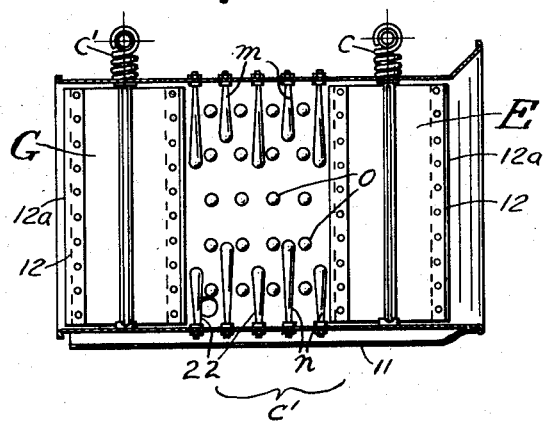
Figure 4 is a longitudinal central sectional view taken on the line 4x—4x of Fig. 1.
Figure 5:
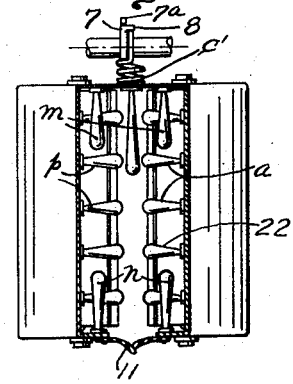
Figure 5 is a transverse sectional view of one of the casings taken on the line 5x—5x of Fig. 1, showing the plant beaters therein.
Figure 7:
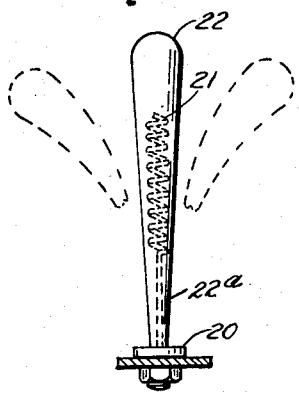
Figure 7 is an enlarged detail illustration of one of the beaters for dislodging cotton from the plants.

Intermediate the ends of the casing which are enlarged to enclose the revolving doors is a narrower rectangular central section, indicated by C', in which I provide elements extending inwardly from its four walls for engaging the cotton plants during their passage through the casing, to aid in dislodging the cotton. These elements are in the nature of beaters which are set into action by their engagement with the plant stalks and branches. To this end I form these elements with a base 20 by means of which they may be bolted to the walls of the casing (see Fig. 7) from which extends a coil spring 21 embedded in a rubber composition formed, as shown, to give a bulbous outer end 22 and a thin neck portion 22a. In Figs. 4 and 5 I have shown said beaters depending from the top of the casing and extending upwardly from its bottom as indicated by m and n respectively. Likewise the beaters which extend inwardly from the two side walls of the casing are indicated by o and p. From this construction it will be seen that as a plant first engages a beater it will be deflected and its resistance will drag off some of the cotton. As the plant branches are disengaged therefrom they swing back to forcefully engage other branches of the plant to dislodge the cotton from their bolls. As the plants pass through the casing in succession it will be seen that the beaters are in a constant state of agitation.

I collect the harvested cotton by a strong air current created in a channel leading from the harvesting chamber and discharging into a suitable receptacle located in rear of the machine. Illustrative of this feature of my invention I have shown the equipment mounted on the top of the machine on supports 25 extending between the frame members A and B. A suitable source of power, such as a motor K which is preferably a hydrocarbon engine is connected by a belt 26 to the drive shaft 27 of a suction fan (not shown) operating in the casing L, as will be understood. Leading from opposite sides of the latter are short lengths of flexible tubing 40, which accommodate lateral adjustments, and are connected to conduits 28 which open into and are connected to the lower portions of the chambers C and D. The cotton which is gathered by the conduits 28 upon reaching the blower casing is expelled through the outlet 29 into a bag 30 suspended from an extension 31 projecting from the rear end of the frame 25. In practice I make the extension 31 circular, provide it with vents 32, for the escape of excess air, and use a readily detachable connection between a depending flange on its lower side and the collar or band 30a on the bag 30, so that successive bags may be quickly applied.

I claim:

1. In a cotton harvester the combination with a frame, a chamber carried thereon open at its ends and having a slotted bottom said casing having laterally enlarged semi-cylindrical ends and a narrower intermediate section, flexible flaps normally closing said slotted bottom, of pairs of revolving doors having meeting edges normally closing the two ends of the casing, and flexible plant beaters extending from the walls of the narrow intermediate portion of the chamber between said sets of doors.

2. In a cotton harvester, the combination with a vehicle frame, an open-ended and slotted-bottom chamber carried on the frame and flexible means normally closing said bottom opening, of a pair of revolving doors normally closing the front end of chamber which are openable upon engagement with a cotton plant to permit the entrance of a cotton plant, means in rear of the doors for stripping the cotton from said plant, a similar pair of doors at the rear of the chamber which normally close it and are openable upon engagement with said plants to permit the exit of the plants, and an air conduit leading from the chamber for conveying therefrom the cotton collected therein.

3. In a cotton harvester, the combination with a frame, an open-ended and slotted-bottom chamber carried on the frame and flexible means normally closing said bottom opening, of pairs of revolving doors normally closing the front and rear ends of the chamber independently operated by engagement with cotton plants and serving to permit the entry of successive cotton plants in a row of such plants and their exit from the chamber, and flexibly mounted beaters projecting inwardly from the walls of the chamber which are set in motion by plant engagement therewith to dislodge the cotton from the same or succeeding plants, and an air conduit leading from the chamber for collecting the cotton therein.

4. In a cotton harvester, the combination with an inverted U-shaped frame, a chamber suspended therefrom having a slotted bottom and open at its ends, of pairs of revolving doors having flexible meeting edges normally closing the ends of the chamber and operable under the pressure of a plant to permit its entrance into and exit from the chamber, yielding flaps normally closing the bottom of the chamber around the stem of a plant in its progress through the chamber, means in the intermediate portion of the chamber for agitating the plant to dislodge the cotton, said means comprising a plurality of flexible beaters extending from the top, bottom and side walls of the chamber, air suction apparatus mounted on the top of the frame and a conduit leading therefrom to said chamber.

5. In a cotton harvester, the combination with an inverted U-shaped vehicle frame, an open-ended and slotted-bottom chamber resiliently supported and swingingly held beneath the frame having semi-circular enlargements at its ends and a narrower intermediate connecting portion, of pairs of revolving doors normally closing the front and rear ends of the chamber and serving to permit the entry of successive cotton plants into and their exit from the chamber, flexible flaps normally closing the slot in the bottom of the chamber and flexible supported beaters on the side walls of the chamber extending into the path of plants passing therethrough.

6. In a cotton harvester, the combination with a vehicle frame, an open-ended and slotted-bottom chamber, and flexible flaps normally closing said slot, of pairs of revolving doors normally closing the entrance and exit ends of the chamber journaled on vertical pivots, a collar having fluted surfaces on which the bottoms of the doors ride serving to position their meeting edges in a closed position following each movement of the doors, and means within the chamber for dislodging cotton from plants passing through the chamber.

CHARLES V. HENLEY.

REFERENCES CITED

The following references are of record in the file of this patent:

UNITED STATES PATENTS

| Number | Name | Date |
| --- | --- | --- |
| 515,031 | Turner | Feb. 20, 1894 |
| 946,454 | Mays | Jan. 11, 1910 |
| 1,213,529 | Neil | Jan. 23, 1917 |
| 1,342,528 | Chancellor | June 8, 1920 |
| 1,713,398 | Rountree | May 14, 1929 |
| 2,011,924 | Benjamin | Aug. 20, 1935 |